United States Patent
Byron et al.

(10) Patent No.: US 9,183,831 B2
(45) Date of Patent: Nov. 10, 2015

(54) TEXT-TO-SPEECH FOR DIGITAL LITERATURE

(71) Applicant: International Business Machines Corporation, Armonk, NY (US)

(72) Inventors: Donna Karen Byron, Littleton, MA (US); Alexander Pikovsky, Littleton, MA (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 14/227,462

(22) Filed: Mar. 27, 2014

(65) Prior Publication Data

US 2015/0279349 A1 Oct. 1, 2015

(51) Int. Cl.
G10L 13/08 (2013.01)
G10L 13/027 (2013.01)
G10L 13/04 (2013.01)

(52) U.S. Cl.
CPC ............ *G10L 13/027* (2013.01); *G10L 13/043* (2013.01)

(58) Field of Classification Search
USPC ........................................................ 704/260
See application file for complete search history.

(56) References Cited

U.S. PATENT DOCUMENTS

| | | | |
|---|---|---|---|
| 5,860,064 A | 1/1999 | Henton | |
| 7,099,826 B2 | 8/2006 | Akabane et al. | |
| 7,401,020 B2 | 7/2008 | Eide | |
| 7,523,036 B2 | 4/2009 | Akabane et al. | |
| 8,332,741 B2 | 12/2012 | Evans et al. | |
| 8,386,265 B2 | 2/2013 | Subramanian et al. | |
| 2009/0254345 A1* | 10/2009 | Fleizach et al. | 704/260 |
| 2010/0299149 A1* | 11/2010 | Kurzweil et al. | 704/260 |

(Continued)

FOREIGN PATENT DOCUMENTS

| | | |
|---|---|---|
| EP | 2175442 | 7/2010 |
| EP | 1245023 | 3/2011 |

(Continued)

OTHER PUBLICATIONS

Darves, Courtney, et al.: "The Impact of Auditory Embodiment on Animated Character Design", Abstract retrieved from http://citeseerx.ist.psu.edu/viewdoc/summary?doi=10.1.1.76.2830 on Feb. 14, 2014.

(Continued)

*Primary Examiner* — Abul Azad
(74) *Attorney, Agent, or Firm* — Robert H. Frantz; Jeffrey S. LaBaw

(57) ABSTRACT

A digital work of literature is vocalized using enhanced text-to-speech (TTS) controls by analyzing a digital work of literature using natural language processing to identify speaking character voice characteristics associated with context of each quote as extracted from the first work of literature; converting the character voice characteristics to audio metadata to control text-to-speech audio synthesis for each quote; transforming the audio metadata into text-to-speech engine commands, each quote being associated with audio synthesis control parameters for the TTS in the context of each the quotes in the work of literature; and inputting the commands to a text-to-speech engine to cause vocalization of the work of literature according to the words of each quote, character voice characteristics of corresponding to each quote, and context corresponding to each quote.

10 Claims, 6 Drawing Sheets

(56) References Cited

U.S. PATENT DOCUMENTS

2012/0265533 A1 10/2012 Honeycutt
2013/0289998 A1* 10/2013 Eller et al. .................... 704/260

FOREIGN PATENT DOCUMENTS

| WO | WO2004100638 | 11/2004 |
|---|---|---|
| WO | WO2006083690 | 8/2006 |

OTHER PUBLICATIONS

FPL; "Distributed Real Time Speech Recognition System"; Feb. 3, 2011. Application No. 00977144.5.

FPL; "Source-Dependent Text-to-Speech System"; Nov. 25, 2004. Application No. PCT/US2004/013366.

FPL; "Variable Text-to-Speech for automotive application"; Apr. 14, 2010. Application No. 09168670.9.

NPL; "A Corpus-Based Approach to <AHEM/> Expressive Speech Synthesis"; retrieved on Jan. 30, 2014 from http://www.research.ibm.com/tts/pubs/SSW2004abs.txt.

NPL; "IBM Text-to-Speech Research"; retrieved on Jan. 30, 2014 from http://www.research.ibm.com/tts/.

NPL; "IBM Text-to-Speech API Reference"; retrieved on Jan. 30, 2014 from www.wizzardsoftware.com/docs/tts.pdf.

NPL; "Control of Voice Quality for Emotional Speech Synthesis"; Published by Enrico Marchetto.

NPL; "Interactive TTS Demo"; retrieved on Feb. 14, 2014 from http://www.nuance.com/for-business/by-solution/customer-service-solutio.

FPL; "Language Engine Coordination and Switching"; Published on Aug. 10, 2006. Application No. PCT/US2006/002838.

\* cited by examiner

One night—it was on the twentieth of March, 1888—I was returning from a journey to a patient (for I had now returned to civil practice), when my way led me through Baker Street. As I passed the well-remembered door, which must always be associated in my mind with my wooing, and with the dark incidents of the Study in Scarlet, I was seized with a keen desire to see Holmes again, and to know how he was employing his extraordinary powers. His rooms were brilliantly lit, and, even as I looked up, I saw his tall, spare figure pass twice in a dark silhouette against the blind. He was pacing the room swiftly, eagerly, with his head sunk upon his chest and his hands clasped behind him. To me, who knew his every mood and habit, his attitude and manner told their own story. He was at work again. He had risen out of his drug-created dreams and was hot upon the scent of some new problem. I rang the bell and was shown up to the chamber which had formerly been in part my own.

Fig. 2a

"My dear Holmes," said I, "this is too much. You would certainly have been burned, had you lived a few centuries ago. It is true that I had a country walk on Thursday and came home in a dreadful mess, but as I have changed my clothes I can't imagine how you deduce it. As to Mary Jane, she is incorrigible, and my wife has given her notice, but there, again, I fail to see how you work it out."

I could not help laughing at the ease with which he explained his process of deduction. "When I hear you give your reasons," I remarked, "the thing always appears to me to be so ridiculously simple that I could easily do it myself, though at each successive instance of your reasoning I am baffled until you explain your process. And yet I believe that my eyes are as good as yours."

Fig. 2b

TEXT-TO-SPEECH FOR DIGITAL LITERATURE

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

None.

MICROFICHE APPENDIX

Not applicable.

INCORPORATION BY REFERENCE

U.S. patent application Ser. No. 14/094,934, filed on Dec. 3, 2013, by common inventor Eric Woods, is hereby incorporated by reference in its entirety.

U.S. patent application Ser. No. 13/772,017, filed on Feb. 20, 2013, by common inventor Eric Woods, is hereby incorporated by reference in its entirety.

FIELD OF THE INVENTION

This invention relates generally to methods and processes for creating audible speech from digital text, such as for a computer to read aloud the text of a book, web page, or magazine article, for the consumption of a hearing user.

BACKGROUND OF INVENTION

Text-to-speech technology (TTS) enables a computer read text aloud via a synthesized voice. Computer-generated voices of the existing art can sound very unnatural and monotonic, even when the words of the text are properly annunciated, because natural human spoken speech varies the inflection and even the pronunciation of words due to a large number of variables at the sentence, paragraph, and context levels. Still further, education level, regional dialect, and mood provide further intonation and expressive characteristics of spoken speech which computer-generated speech does not faithfully reproduce. Thus, computer-generated voices, while accurately conveying the written words of a digital text, often sound cold and lifeless, and do not convey much of the rest of the meaning of the digital text.

With respect to literature, these shortcomings prevent TTS technology from being a viable option for performing literature aloud to a human audience. Unlike short mechanical phrases, literature consists of varying mood, character profiles, ebb & flow, and many nuances and other contextual information that must be conveyed in order to effectively capture the tone of a plot. While TTS technology has improved in recent years, the present inventors have recognized that today's TTS systems are largely agnostic to these plot elements and character attributes, limiting its capacity to portray a piece of literature accurately.

Recent advancements in TTS technology consider characteristics of the target listener to customize the playback for the listener. For example, technology currently exists for synthesizing a voice in the style of listener's voice, dialect, gender, etc., based on parameters supplied to the TTS engine. However, this is not helpful for effectively capturing the mood or characters within a piece of literature because the reader/listener is not one of the characters in the literature.

For these reasons, the inventors have recognized that there is a need in the art for an improved system of verbalization by a computer of a digital work of literature which accurately portrays the voice intonation, accent, dialect, education level, and mood of each character, and optionally a narrator, in the work of literature.

SUMMARY OF THE INVENTION

A digital work of literature is vocalized using enhanced text-to-speech (TTS) controls by analyzing a digital work of literature using natural language processing to identify speaking character voice characteristics associated with context of each quote as extracted from the first work of literature; converting the character voice characteristics to audio metadata to control text-to-speech audio synthesis for each quote; transforming the audio metadata into text-to-speech engine commands, each quote being associated with audio synthesis control parameters for the TTS in the context of each the quotes in the work of literature; and inputting the commands to a text-to-speech engine to cause vocalization of the work of literature according to the words of each quote, character voice characteristics of corresponding to each quote, and context corresponding to each quote.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

FIGS. 2a and 2b provide illustration of digital text and how features of characters' voices can be extracted from the text.

DETAILED DESCRIPTION OF EMBODIMENT(S) OF THE INVENTION

Problems Recognized

Figure 1:
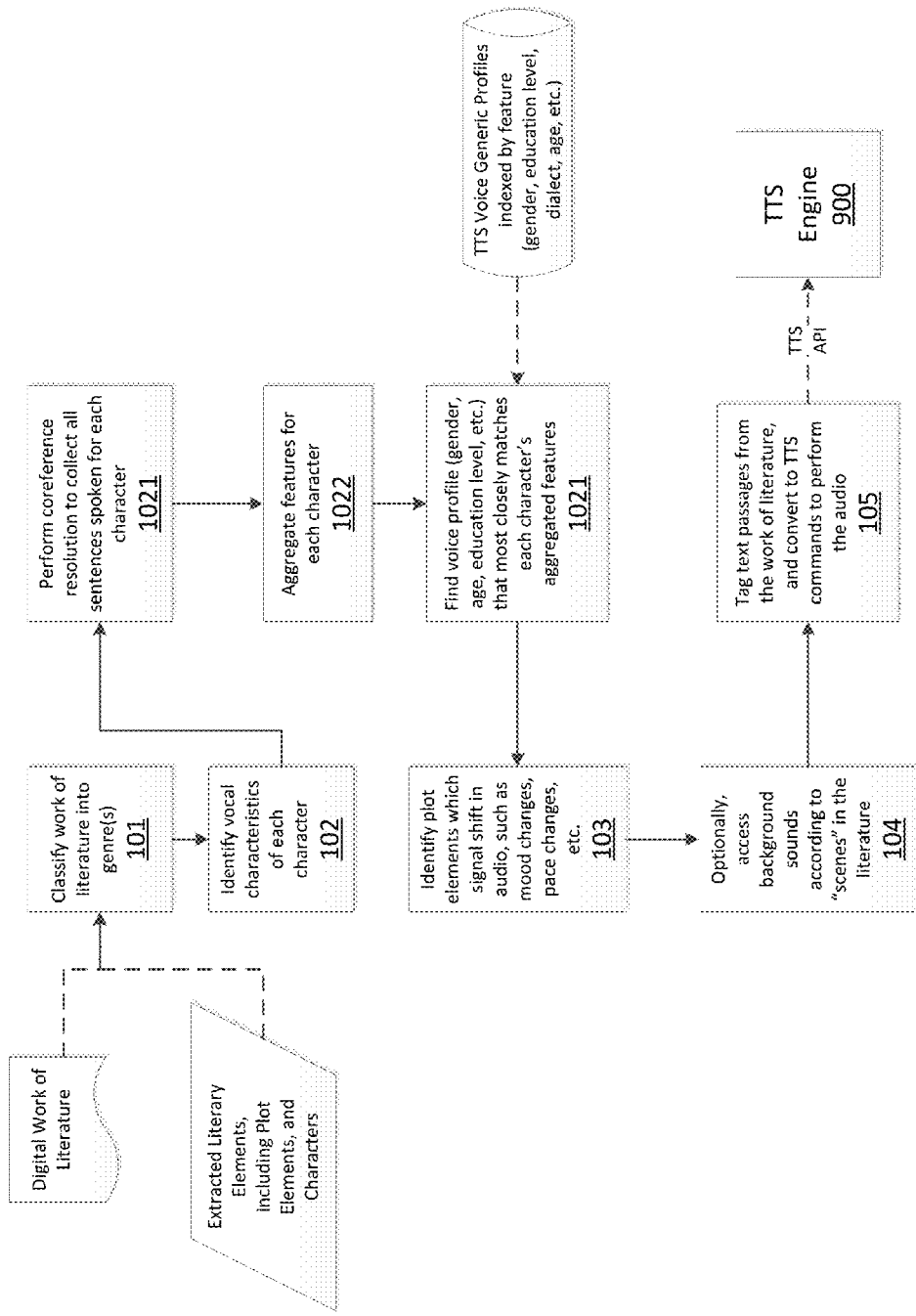
FIG. 1 illustrates a logical process according to the present invention.

The present inventors have recognized a problem in the art which they believe is as-of-yet unrecognized by those skilled in the art, and unsolved regarding the accurate verbalization of human voice reading digital text, such as a digital or digitized work of literature (book, web page, magazine, etc.). While existing technologies readily pronounce words individually correctly, they do not accurately change voice tone, pitch, intonation, accent, speed of delivery, or other characteristics which humans do when performing a script or reading a book to an audience. This extra level or layer of interpretive annunciation depends on context within a sentence, within a paragraph, and indeed, within the story line of the work of literature. Thus, simple interpretation of punctuation marks by a traditional TTS engine is insufficient to convey complex mood differences of characters from chapter to chapter, for example.

Review of the Available Technologies

In a search for available technologies to address this unrecognized problem in the art, the present inventors found several existing technologies which fell short of the need in one or more ways. Some technologies allow a user to dictate to speech (e.g., speech recognition technology), and then to have that text read back to the user in the user's own voice. This is of limited value to the present problem, however, because the user is rarely a character in the literature he or she wishes to have verbalized. Another technology, intended for use in high-background noise environments such as a vehicle, adjusts the TTS synthesized voice within a based on the vehicle's operating conditions to convey urgency, reduce distraction, etc.

While this does begin to verbalize the text on a level greater than a word-basis, it too is insufficient to address the problem the inventors have identified.

Another TTS technology customizes the synthesized narration of a book based on the listener's demographics and personalizations, but fails to consider the plot elements within the book to influence the voice playback and does not produce different voices for different characters according to the demographics of the characters in the book.

Other recent advances in coordinating speech recognition and TTS technologies have produced interactive, conversational interfaces that incorporate animated characters. These audible user interfaces potentially are well suited for educational software, whereas they can engage children as active learners and support question asking skills, allowing a computer to animate a character and to verbally interact with the learner. However, this type of short-phrase interaction is more of a transactional process (e.g., ask and answer, ask and answer, etc.), and it is not able to use the entirety of a work of literature to enhance the verbalization of a character's speech in a book, for example.

Another available TTS method generates speech from text messages, including determining a speech feature vector for a voice associated with a source of the text message, and comparing the speech feature vector to speaker models. The method also includes selecting one of the speaker models as a preferred match for the voice based on the comparison, and generating speech from the text message based on the selected speaker model. A larger work of literature than a text message, however, includes contextual plot elements which should influence the voice synthesis, which are not handled by this text message reader.

Yet another method of TTS selects an appropriate voice to represent a character in a drama, but stops there and does not consider contextual plot data to properly express the mood and tone throughout the plot. And, a similar method of TTS selects a voice to represent a character in a drama based on user-provided inputs, but also fails to consider contextual plot dynamics.

In another TTS system, a profile of a speaker is created, and the system selects a voice that corresponds to the speaker's profile. Metadata can be obtained directly from the communication or from a secondary source identified by the metadata. The metadata can be used to create a speaker profile, and the speaker profile can be used to select voice data. The selected voice data can be used by a text-to-speech (TTS) engine to produce speech output having voice characteristics that best match the speaker profile. In view of the present problem addressed by the inventors, this technology also fails to consider contextual plot elements, like mood/tone, to influence annunciation of the speaker voice.

Having found no suitable technology to address the problem recognized by the present inventors, the inventors set out to create a technology which could (a) extract plot elements from literature at varying levels of abstraction, (b) detect literary elements and their importance through semantic analysis and literary correlation, and (c) translate these plot elements, literary elements, and associated importance indicators into controls for TTS synthesis to yield a life-like vocalization of a work of literature in a manner which portrays mood, plot context, and character-specific intonation.

A First Exemplary Embodiment

The present invention provides a method and system which of leverages literary elements extracted from a work of literature (e.g., novel, short story, etc.) or non-fiction (e.g., historical account) to accurately express each individual character's emotion and inflection according to the ebb and flow of plot elements when vocalizing the work via an enhanced TTS system. Rather than just selecting a synthesized voice that aligns with a character's established profile (age, gender, accent, etc.). Natural Language Processing (NLP) techniques are utilized to extract literary elements, including plot elements, from a work of literature. These literary elements, and their changes throughout the work of literature, are used to augment the commands to a TTS engine such that the resulting speech not only represents a voice of each character, but also more closely represents the mood and attitude of the character at each point during the plot of the work of literature. Thus, the TTS output takes on more of a performance aspect than just a word-by-word or sentence-by-sentence context.

This first embodiment preferably utilizes NLP analysis techniques that extract literary elements from the work disclosed in co-inventors patent applications, incorporated by reference herein, or from other engines which can accomplish similar extraction and modelling of the structure of works of literature. To create command and API parameters that are input into a TTS system in order to produce a more realistic text-to-speech output for the listener, a general process according to the invention is illustrated in FIG. 1:

(101) classify the work of literature in terms of its literary elements, such as humor, crime thriller, adventure, romance, etc.;

(102) identify vocal characteristics for each character, and optionally a narrator, with a speaking role in the work of literature according to his or her persona, which can be accomplished by first performing co-reference resolution (1021) to collect all sentences in the work that refer to this character, then aggregating (1022) features for each character (e.g., gender, age, occupation and hobbies), and then utilizing machine learning to select (1023) the a matching voice from among a library of possible voices keyed to those personal characteristics;

(103) identify plot elements and situational factors throughout the work of literature that influence the audio properties, such as voice tone as indicated by the plot at each speaking point is happy, fearful, excited, stressful, inquisitive, etc.; and (104) optionally, access or retrieve background sound clips to play according to scenes during TTS vocalization, such as birds signing in a park, crowd noise at a sports game, traffic noise on a street, etc.

These discovered features are tagged onto corresponding passages of the text from the work of literature, and then converted (105) to specific TTS command sets for input into the TTS engine (900) that produces an audio representation for each sentence in the work to be narrated. The TTS engine is assumed to have access to a library containing a plurality of voice prints, as well as a way to command the TTS engine to use a particular voice in producing audio for a given textual input.

Available machine learning processes may be employed to assist in the selection of a profile voice that conforms to the discovered features, so that the vocal characteristics are appropriate for the narrator of the piece and for each character. Both the voice profiles for each speaker and the ambient properties (such as emotional tone) for each sentence are determined and fed to the TTS engine to produce audio for each sentence. The TTS engine modifies the generated audio representation of the text to calibrate with the emotional tone and speaking voice chosen by the feature selection stage for each sentence.

In one manner of operation of at least one embodiment, a user chooses a work of literature or non-fiction to be narrated. The TTS profile and character models are generated by an NLP analysis process, and an audio file is output for user playback (e.g. *.wav, *.mp3, etc.) to the user via a computing platform's speakers, headset or headphone.

Referring now to FIG. 2a, an opening paragraph from "The Adventures of Sherlock Holmes" by Sir Arthur Conan Doyle, as available from the Gutenberg Project without copyright, is shown. The entire paragraph is identified to be spoken in the narrator's voice (200), and identified as a character element. Two literary elements (201, 202) indicate a street scene in the late 1800's, so optionally, background sounds from a library may be played during the synthesis of the narrator's voice (e.g. horse hooves and wagon wheels on cobble stone streets, etc.). Two other literary elements (203, 204) can also be used to play sound effects (e.g. era-appropriate door bell, footsteps on stairs) at the approximate proper time of the vocalization of the narrator's voice for this paragraph. In FIG. 2b, top paragraph, the system detects characters named "Holmes" and "Mary Jane", neither of which are the narrator (according to the NPL analysis), and the latter of whom has a mood of "incorrigible". In the bottom paragraph, the system detects the narrator is laughing or amused (208, 209) when he speaks the quoted portion.

Example TTS Engine and API

Embodiments of the present invention preferably interface to an available TTS engine, program or server via an API. Most available TTS engines have external controls to manipulate persona-based and emotional characteristics of the synthesized voice. For example, one available TTS engine is FESTIVAL, which can produce emotionally-enhanced text from input comprising Attention Profiling Mark-up Language or Voice Extensible Markup Language (APML/VSML). Nuance Communications, Inc., provides a similarly capable product, Loquendo™, which also uses a markup language to provide further synthesis command to the TTS engine. And, IBM provides at least two TTS engines and servers.

For generic, platform independent disclosure here, we provide the following example marked-up language metadata according to the extracted literary elements and character elements of FIGS. 2a and 2b in the order that they are seen in the figures, wherein the mark up tags are provided in pseudo-code format (e.g. they may need conversion to a particular format for a particular API to a specific TTS engine):

<speaker=narrator; mood=neutral>
"One night—it was on the twentieth of March, 1888—I was returning from a journey to a patient (for I had now returned to civil practice), when my way led me through
<mix_on=background, file=1800sStreet>
Baker Street. As I passed the well-remembered door, which must always be associated in my mind with my
. . .
<mix_on=foreground, file=1800sDoorBell>
I rang the bell and was shown up to the chamber which had formerly been in part my own."
<mix_off=foreground>
<mix_off=background>
<mix_on=background; file=footsteps_on_stairs>
<pause><mix_off=background>

And, from FIG. 2b, the marked up text for input to a TTS engine may appear as such:
<speaker-narrator; mood=greeting>
"My dear Holmes,"
<speaker-narrator; mood=neutral>
said I,
<speaker=narrator; mood=greeting>
"this is too much. You would certainly have been burned, had you lived a few centuries ago. It is true that I had a country walk on Thursday and came home in a dreadful mess, but as I have changed my clothes I can't imagine how you deduce it. As to Mary Jane, she is incorrigible, and my wife has given her notice, but there, again, I fail to see how you work it out."
. . .
<speaker=narrator; mood=neutral>
I could not help laughing at the ease with which he explained his process of deduction.
<speaker-narrator; mood=laughing>
"When I hear you give your reasons,"
<speaker-narrator; mood=neutral>
I remarked,
<speaker=narrator; mood=laughing>
"the thing always appears to me to be so ridiculously simple that I could easily do it myself, though at each successive instance of your reasoning I am baffled until you explain your process. And yet I believe that my eyes are as good as yours."

The reader should note that the mood parameters in the foregoing markups can be inferred not only from the local text, such as "laughing" in this example, but may also be inferred or modified by the literary elements from the model of the entire work of literature, as described in the related patent applications.

A Second Exemplary Embodiment

In a second exemplary embodiment, even more realism is brought forth through the TTS engine by further enhancing the command set prepared to input into it. After a work of literature has been made into a movie, the voices and intonations of the characters become associated with the actors who portrayed the characters in the movie. Some franchises of series of works of literature have successfully employed different actors during different periods of time, such as Ian Fleming's James Bond 007 novels, which have been made into movies in which multiple actors have portrayed the main character. However, other novel series, such as J. K. Rowling's Harry Potter series of novels, have only been made into movies using the same actors, whose voices have become synonymous with the characters. It is safe to say, if one has seen a Harry Potter movie and then one reads a novel, one will hear the actors' voices for each character in their mind as they read the novel.

However, for works of literature which have not yet been made into a movie or stage production, voices of characters are imagined by the readers. This imagined voice for each character can be shaped by the author's clues, such as an author describing a character's voice, and by describing moods and inflections at each quote. But, still, a lot is left to the imagination of the reader.

In a further enhanced embodiment of the present invention, readers' imaginations are harnessed to assist in creating a TTS voice output which matches the imagination of a majority of readers. The present inventors attempted to locate a technology for achieving this, and found none suitable.

Figure 3:
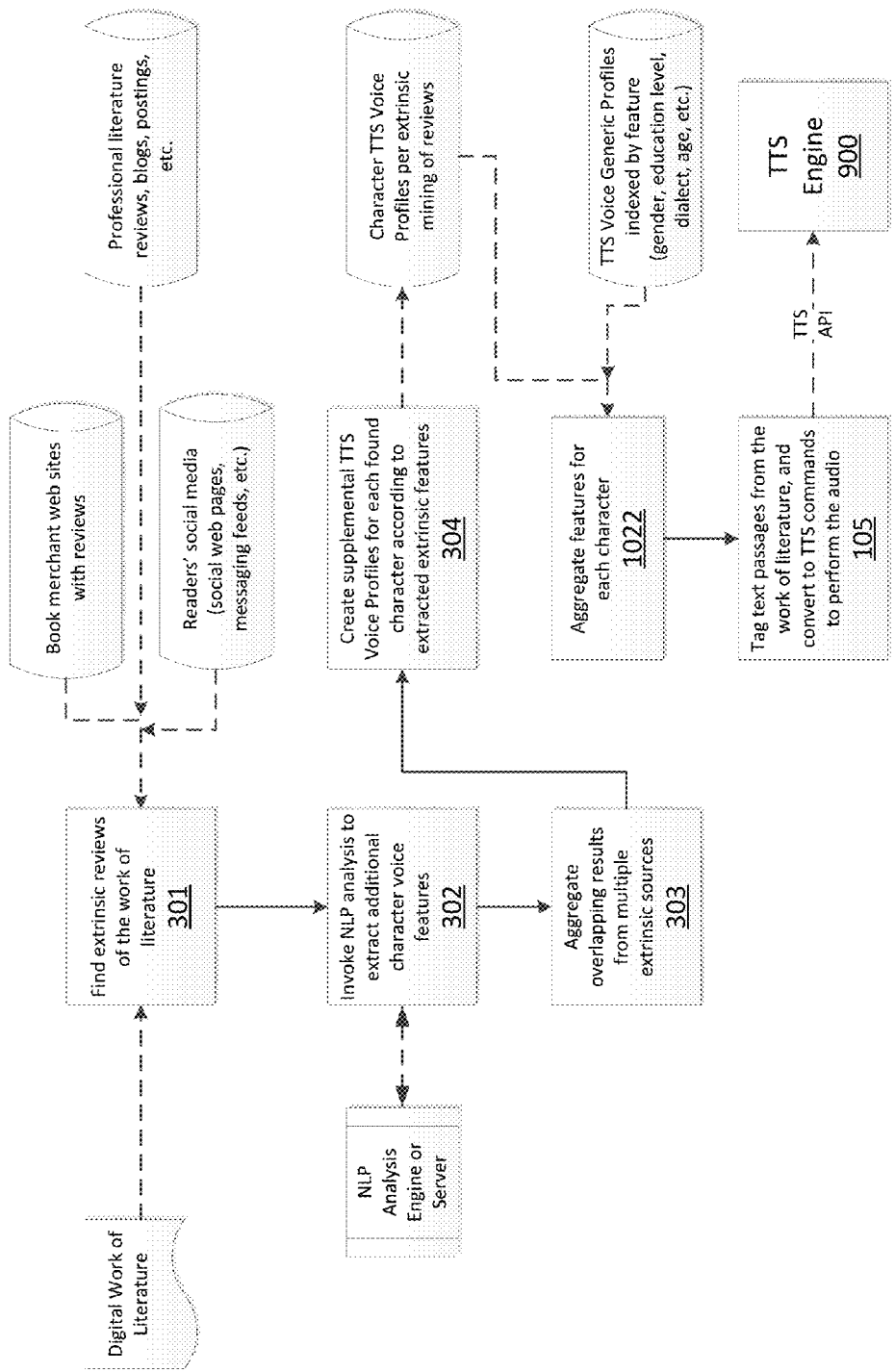
FIG. 3 sets forth an enhanced logical process according to the present invention which further engages extrinsic information to glean additional voice features of character voices.

Thus, the inventors have defined a further enhancement of the present invention in which external interpretations of character voices can be co-opted by the system to supplement the voice descriptions from the work of literature. In this embodiment, a system according to the present invention will use a wide corpus of labeled literary works as secondary (supplemental) sources described in the following paragraphs to build a machine learning model for commanding and producing TTS profile settings for each character. Before narration is produced by a TTS engine, such a logical process as depicted in FIG. 3 will perform some or all of the functions:

(301) The system will find available merchant and user reviews of the literary work using plurality of web sites and navigation methods. The set of sites will include, but not be limited to, online book store reviews, popularly edited web sites (e.g. Wiki style media), social web sites and services (e.g. FaceBook™, Google+™, YouTube Channels™, Twitter™ feeds, etc.), and literary review sites. From these sources, extrinsic to the work of literature itself, the system can find addition information regarding interpretations and imagined characteristics of each characters voice, some of which may even suggest a inferred casting choice (e.g. actor or actress) for each character, from which voice characteristics can be gleaned.

(302) The system will have NLP analysis performed by an NLP engine to extract information about genre, plot devices, humor and characters from these extrinsic sources. For each character attempt to identify a plurality of narration characteristics such as gender, age, nationality, cultural background, etc.

(303) Because multiple reviews may have overlapping information, it may be aggregated and validated across the available sources. In a preferred embodiment, such NLP and aggregation operations will produce a set of features for the work of literature as well as sets of features for the individual characters.

(304) For each found character in the work of literature, the system will develop automatically, and optionally interactively with a user, each character's text-to-speech profile based on obtained metadata from the work of literature and from the corpus of extrinsic information. Greater weight may be placed on features drawn from the work of literature if there is a conflict in a feature presumption between the extrinsic corpus and the work's internal description. In a preferred embodiment, the TTS model and extracted features will be used to generate this character voice profile.

During TTS output generation, if a character for the sentence being vocalized is known in the supplemental TTS profiles, the system will use that character's supplemental TTS profile to further tune the inflection commands and parameters input to the TTS engine. If a particular character is not known in the supplemental TTS profiles and is also not known in the profiles created from analysis of the work of literature, the system may invoke additional NLP analysis of the sentences leading up to the sentence being vocalized to determine the new character's narration characteristics.

In this latter case, the previously-unknown character's voice profile which has been inferred from the immediately-preceding text can then be stored into either (or both) of the repositories of character TTS profiles, thus engaging a stage of machine learning as the work of literature is vocalized for the first time.

In order to convert or map the extracted voice features to voice TTS commands, existing processes such as those available in U.S. Pat. Nos. 7,523,036 and 7,401,020 may be employed, or other suitable processes which are within those skilled in the art to find and render to code.

Third Exemplary Embodiment

As discussed in the foregoing paragraphs, a user experience of text-to-speech rendition of literary works may be greatly improved by utilizing the deep analysis of the work such that vocalization of individual characters can be performed in a way that most closely resembles the actual characters. It is a common situation when same or similar characters appear in a number of works. Harry Potter books provide a good example. If a user wants to listen to multiple books from in a series, it is important to preserve consistency of voice-over performance; the same character should be narrated in a consistent and recognizable way.

In some cases there is not a character in common between two or more works of literature who is identifiable by name, but the common character may have some recognizable properties. For example, if a character is known as 'southern old man store owner", a very specific narration can be selected, with appropriate pitch, accent, gender, etc. A separate consideration is that complete deep literary analysis of a work might be expensive and take a long time. In this third embodiment, a technique that speeds this analysis and provides consistency of vocalization across multiple works of literature for non-named characters is provided.

When voice-narrating (e.g. vocalizing using TTS) a literary work, a deep literary analysis of the work will be performed according to the previous paragraphs and the incorporated patent disclosures. This analysis identifies various properties of the piece being narrated such as genre, characters, humor, etc. Analysis of literary plot may also reveal similarities between the current work and some other works. These similarities may be at a general level (i.e. genre).

However, frequently the analysis will uncover that the same or a similar character exists in a different literary work. For example, Harry Potter and other characters of Harry Potter books exist in a number of books. Thus, voice-over information (e.g. a TTS profile) for the voice of the Harry Potter character may already be available from a previous narration (for the current user or from other users).

For example, a user is about to listen to the second Harry Potter novel after having listened already used the invention to listen to the to the first digital book via TTS. The system according to the present invention already has access to a TTS profile for a Harry Potter character, as well as for other characters that appeared in the first book and are appearing again in the second book. The system may still make some changes i.e. if it can infer the character has grown older, changed disposition (some previously-good natured characters return in later installments of a series as a villain), etc.

Even if the work of literature is being vocalized for the first time to a user, the system may have already analyzed and vocalized that work for others. These settings can recalled and used to configure voice-over settings for the current user. Moreover, different users may have used somewhat different character TTS settings depending on their personal background. For example, a ten year old listener may prefer a different voice tone and tempo than a twenty-five year old listener may prefer. The literature vocalization system may find other users whose profiles closely match the current user (age, literary preferences, etc.) and attempt to find the preferred settings for the listener's voice-over experience.

Figure 4:
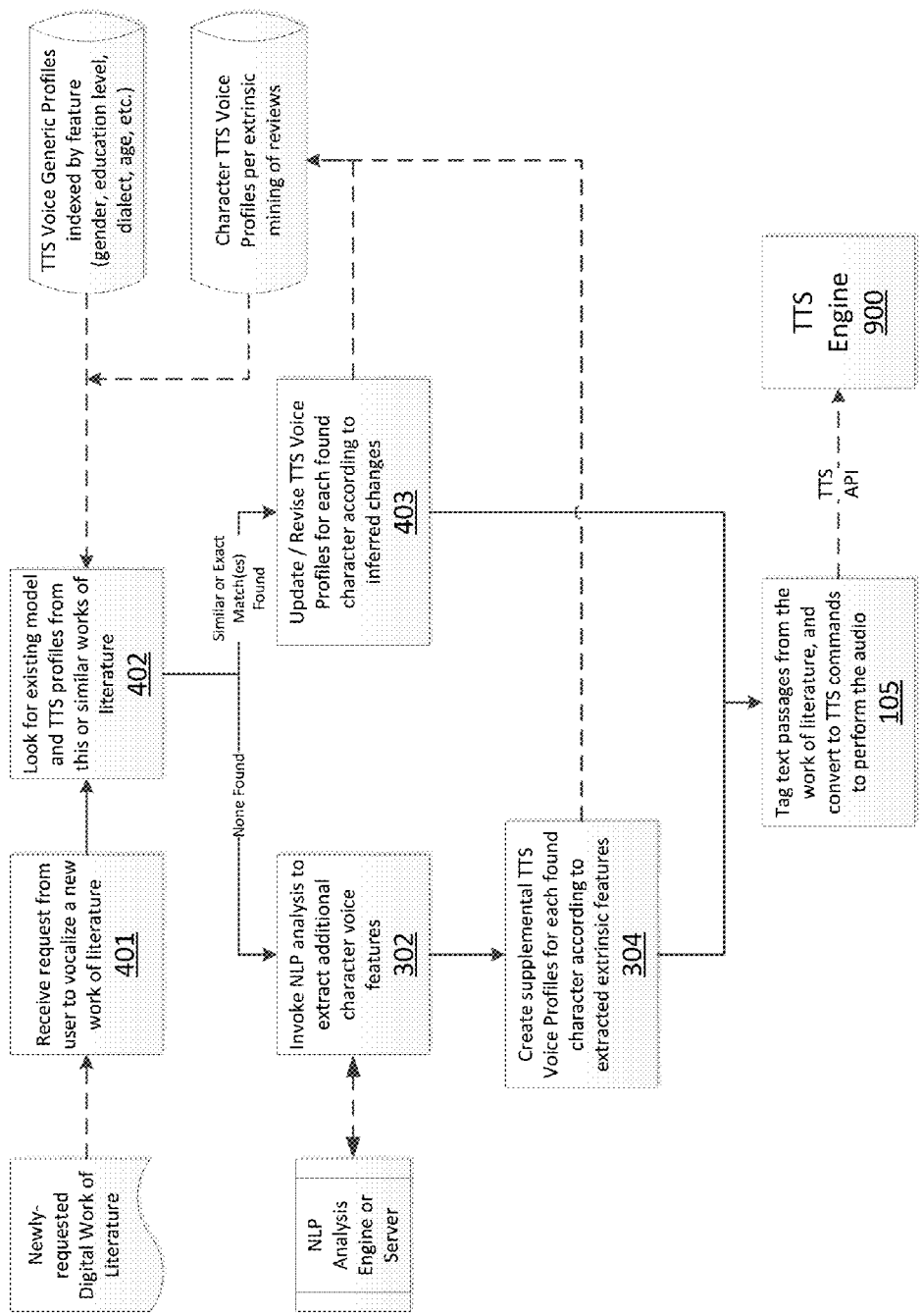
FIG. 4 depicts an enhanced logical process according to the present invention which retrieves previously-defined character voice feature profiles which may have been created by earlier analyses of the same work of literature or from works of literature having the same or similar characters present.

FIG. 4 illustrates an example logical process according to this exemplary embodiment. Initially, a user interacts (401) with the literature vocalization system requesting to narrate a particular digital work of literature. The system (402) either develops a model for the requested literary work, if one is not previously stored in memory or accessible from another system, as previously discussed. When a vocalization of a work of literature is requested for which no vocalizations have previously been performed (e.g. no character voice TTS profiles exist in the system), the system compares (403) literary model for that work with previously known models.

If it turns out the previous works contain similar characters, the system can derive TTS profiles for characters in common with the previous vocalizations from previously stored TTS profiles, such as by copying and optionally revising or updating. If characters in the newer work of literature are not identical by name, or there is an indication that a named character may have significantly changed in between the new and older works of literature, the system may use a number of heuristics to approximate (403) TTS profiles for the current characters.

The system may also maintain a central repository for previously analyzed and vocalized works of literature. Thus, even if the work being played is new to the user, the system may already have a literary model for that work of literature, for its characters and their TTS profiles in the repository which it can retrieve and use. Alternatively, if the system does not have that exact work but has works with the same or similar characters, the system may derive TTS profiles from that information.

Computer Program Product

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the logical processes shown and disclosed herein.

Suitable Computing Platform

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
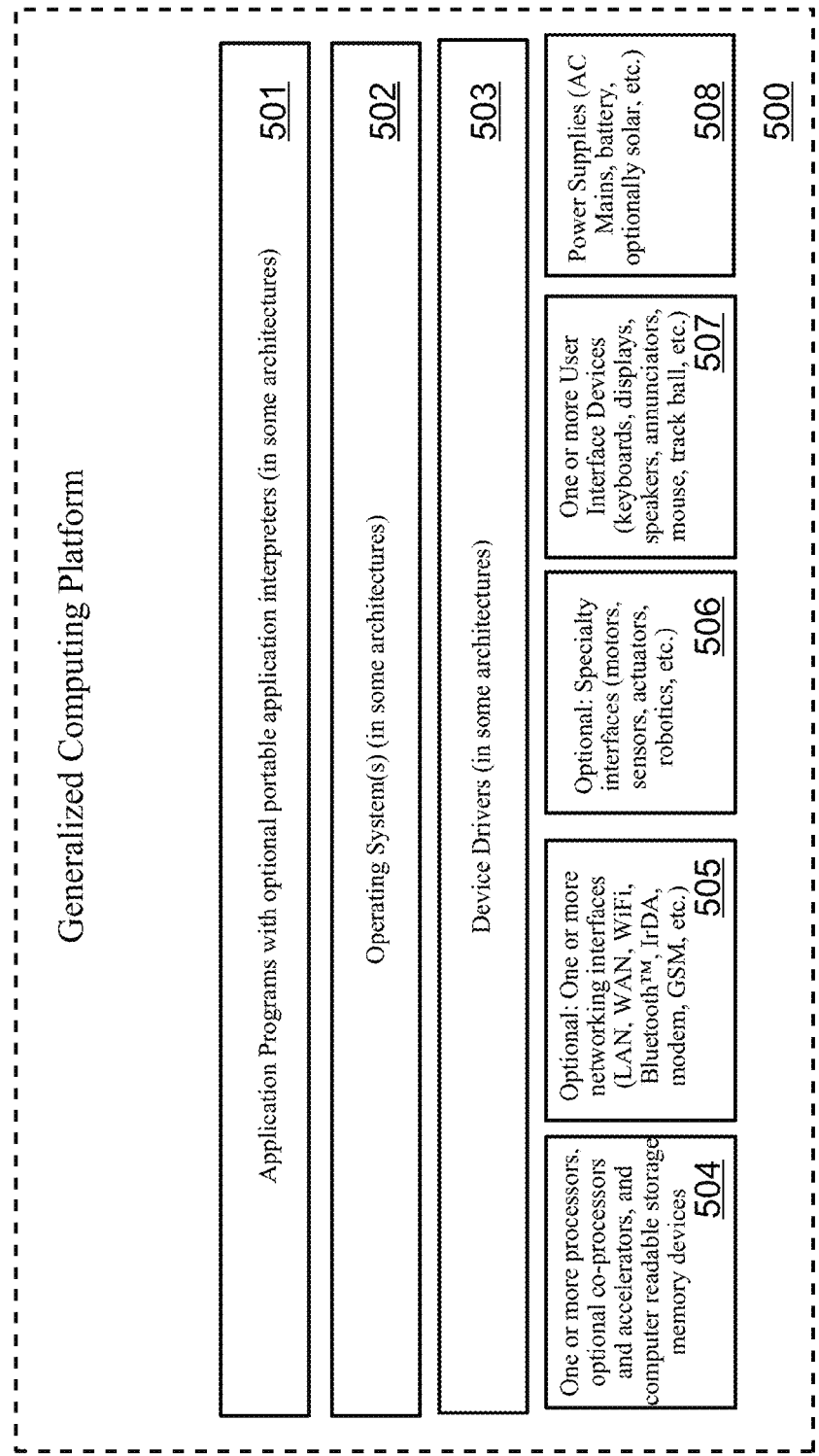
FIG. 5 illustrates a generalized computing platform suitable for combination with program instructions to perform the logical processes shown and described herein.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, UNIX, LINUX, Google Android™, Apple iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

Conclusion

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process or processes.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A computer program product for vocalizing a digital work of literature, comprising:
   a tangible, computer-readable storage memory device; and program instructions encoded by the tangible, computer-readable storage memory device, for causing a processor to perform operations comprising:

analyzing a first digital work of literature using natural language processing to identify speaking character voice characteristics associated with context of each quote as extracted from the first work of literature;

converting the character voice characteristics to audio metadata to control text-to-speech audio synthesis for each quote;

transforming the audio metadata into text-to-speech engine commands, wherein each quote is associated with audio synthesis control parameters for rendering the corresponding character voice characteristics according to the context of the quotes in the first work of literature; and inputting the commands to a text-to-speech engine to cause vocalization of the first work of literature, wherein spoken quotes by characters are vocalized according to the words of each quote, character voice characteristics corresponding to each quote, and context corresponding to each quote.

2. The computer program product as set forth in claim 1 wherein the program instructions further comprise instructions for inferring a narrator character for vocalization of text from the first digital work of literature which are not drawn from a character quote.

3. The computer program product as set forth in claim 1 wherein the first work of literature comprises at least one text source selected from the group consisting of a digital document, a digital book, a digital magazine, a data stream, and a web page, wherein the character characteristics are selected from the group consisting of gender, age, nationality, ethnicity, mood, profession, hero role, villain role, likability, and education level, and wherein the context is selected from the group consisting of genre, tempo, tone, pace, plot elements, subplot elements, and literary elements.

4. The computer program product as set forth in claim 3 wherein the vocalization is adjusted to reflect changes according to plot elements.

5. The computer program product as set forth in claim 1 wherein the program instructions further comprise instructions for:

searching a corpus of sources extrinsic to the first digital work of literature to the identify the same or similar character voice characteristics and same or similar context, wherein the converting and transforming include converting and transforming according to found character voice characteristics and context; and responsive to detecting a current character in the first digital work of literature is derived from, same as or similar to a character in a previously-vocalized work of literature, retrieving and using character voice characteristics according to the previously-vocalized work of literature in the context of a second digital work of literature.

6. A system for vocalizing a digital work of literature, comprising:

a computer having a processor; and a tangible, computer-readable storage memory device encoding program instructions for causing the processor to perform operations comprising:

analyzing a first digital work of literature using natural language processing to identify speaking character voice characteristics associated with context of each quote as extracted from the first work of literature;

converting the character voice characteristics to audio metadata to control text-to-speech audio synthesis for each quote;

transforming the audio metadata into text-to-speech engine commands, wherein each quote is associated with audio synthesis control parameters for rendering the corresponding character voice characteristics according to the context of the quotes in the first work of literature; and inputting the commands to a text-to-speech engine to cause vocalization of the first work of literature, wherein spoken quotes by characters are vocalized according to the words of each quote, character voice characteristics corresponding to each quote, and context corresponding to each quote.

7. The system as set forth in claim 6 wherein the program instructions further comprise instructions for inferring a narrator character for vocalization of text from the first digital work of literature which are not drawn from a character quote.

8. The system as set forth in claim 6 wherein the first work of literature comprises at least one text source selected from the group consisting of a digital document, a digital book, a digital magazine, a data stream, and a web page, wherein the character characteristics are selected from the group consisting of gender, age, nationality, ethnicity, mood, profession, hero role, villain role, likability, and education level, and wherein the context is selected from the group consisting of genre, tempo, tone, pace, plot elements, subplot elements, and literary elements.

9. The system as set forth in claim 8 wherein the vocalization is adjusted to reflect changes according to plot elements.

10. The system as set forth in claim 6 wherein the program instructions further comprise instructions for:

searching a corpus of sources extrinsic to the first digital work of literature to the identify the same or similar character voice characteristics and same or similar context, wherein the converting and transforming include converting and transforming according to found character voice characteristics and context; and responsive to detecting a current character in the first digital work of literature is derived from, same as or similar to a character in a previously-vocalized work of literature, retrieving and using character voice characteristics according to the previously-vocalized work of literature in the context of a second digital work of literature.

\* \* \* \* \*